United States Patent [19]

Romans

[11] Patent Number: 4,969,496
[45] Date of Patent: Nov. 13, 1990

[54] COMBINATION ELECTRIC TABLE SAW AND FOLDING, MOBILE WORK BENCH

[76] Inventor: Dennis R. Romans, 284 Hanover Dr., Costa Mesa, Calif. 92626

[21] Appl. No.: 260,740

[22] Filed: Oct. 21, 1988

[51] Int. Cl.$^5$ .............................................. B27H 1/00
[52] U.S. Cl. ............................... 144/286 R; 108/132; 144/1 R
[58] Field of Search ................ 108/131, 132; 248/129, 248/439; 144/285 R, 286, 1 R

[56] References Cited

U.S. PATENT DOCUMENTS

| | | | |
|---|---|---|---|
| 1,828,248 | 10/1931 | Hallowell et al. | 144/285 |
| 2,139,470 | 12/1938 | Schmeiser . | |
| 2,385,458 | 9/1945 | Naon | 108/131 |
| 2,662,566 | 12/1953 | Kurschner . | |
| 2,722,243 | 11/1955 | Nagy . | |
| 3,118,685 | 1/1964 | Jordan | 144/285 |
| 3,149,651 | 9/1964 | Belrose . | |
| 3,771,848 | 11/1973 | Claywell | 144/285 |
| 4,516,612 | 5/1985 | Wiley | 144/100 R |
| 4,573,415 | 3/1986 | Ramey | 108/132 |
| 4,640,326 | 2/1987 | Hewitt | 144/287 |

Primary Examiner—W. Donald Bray

[57] ABSTRACT

The invention relates to work benches or the like for supporting machine tools or other heavy equipment, and more specifically to folding, mobile work benches. The invention is a combination electric table saw and folding, mobile work bench. When unfolded, the invention consists of a rugged horizontal work bench structure held at working height by four, vertically oriented, heavy duty legs. Two of these legs are mounted upon small wheels and in conjunction with two accessory handles which mount on the opposite side from said wheels, one side of the invention can be easily lifted and the invention moved on said wheels for positioning at the workplace. Each unfolded leg is locked into position by a pivoted dog controlled by an external handle. The legs are capable of being folded and stored within the bench frame structure. When folded, the invention may be moved easily by rolling upon a second pair of wheels attached to said bench frame structure. For storage, the invention is set with the bench frame in the vertical orientation thereby requiring a minimum of floor space.

5 Claims, 2 Drawing Sheets

COMBINATION ELECTRIC TABLE SAW AND FOLDING, MOBILE WORK BENCH

BACKGROUND OF THE INVENTION

The invention relates to work benches or the like for supporting machine tools or other heavy equipment, and more specifically to folding, mobile work benches.

DESCRIPTION OF THE PRIOR ART

The prior art teaches a variety of devices and methods for moving machine tools. U.S. Pat. No. 2,662,566 relates to a folding work bench for power tools. The primary object of this invention is to provide a bench which can be readily transported by means of wheels when moving the entire structure over a rough floor. The particular mechanism which is used in this reference is quite different from that taught in the instant invention.

U.S. Pat. No. 2,722,243 relates to a saw table extension. This device teaches the basic combination of a normal table saw with wheels at the supporting base thereof. While this particular unit might be used for mobility, it does not appear that this structure would actually be capable of doing so because of the means used for attaching it to the table.

U.S. Pat. No. 2,139,470 relates to a portable load supporting structure. Quite clearly, this structure would also apply to a table saw like device. However, this structure fails to disclose the use of a collapsible leg or legs such as envisioned by the instant invention.

U.S. Pat. No. 3,149,651 relates to a package unit saw. It should be particularly noted that this invention includes wheels for ease of portability and it has a lid which opens and closes to make certain that it is safe. In spite of these similarities it is quite different from the transporting device envisioned by the device disclosed in the instant invention since it has neither handles, nor collapsible legs.

U.S. Pat. No. 4,265,283 relates to a work bench structure which includes wheels for moving to another structure. However, no handles are included for readily accomplishing this task.

U.S. Pat. No. 4,516,612 relates to a multipurpose saw table which includes wheels thereon. However, there is no folding support structure or handles for so moving this about, such as is taught herein.

U.S. Pat. No. 4,640,326 relates to a stand for a table saw which includes extensions for supporting long pieces of lumber. However, neither collapsible nor removable legs or handle means such a shown within are incorporated in this particular invention.

None of the prior art disclosures show the combination of features and capabilities of the instant invention. It is the applicants opinion that the combination of storage, mobility and use characteristics of the instant invention make it quite unique and extremely useful.

SUMMARY OF THE INVENTION AND OBJECTS

The within invention consists of a combination electric table saw and foldable, mobile work bench which includes a bench frame of rugged box wall construction upon which the electric table saw is secured, a first pair of table legs disposed beneath the bench frame at one end and secured thereto by hinges, a second pair of table legs disposed beneath the bench frame at the opposite end and secured thereto by hinges, four locking devices manually operated from the sides of the bench frame which permit locking the four legs into the vertical position assumed when supporting the bench frame, such that both sets of table legs are in appropriate parallel relationship whereby both the first and second pair of table legs cooperatively support the bench frame in an elevated position relative to the floor over which the bench frame is disposed. A pair of accessory handles can be secured to one end of the bench frame for leverage when moving it. An axle secured to the opposite end of the bench frame from the pair of handles having a pair of wheels rotatably mounted permits moving of the within invention although the table saw may weigh several hundred pounds. A major advantage of the within invention is the ability to exert considerable leverage through the use of the long accessory handles in raising the bench frame from ground level to working height by pivoting around one set of extended legs. The fact that the second set of legs freely swing into the vertical position allows a single workman to erect the table saw. The fact that the center of gravity of the within invention is lowered to near ground level during moving allows for safer and easier movement by a single workman.

It is one object of the instant invention to provide a new and unique combination device which overcomes drawbacks of prior art devices.

Another object and prominent feature of the within invention disclosed herein is to provide an integral machine which has such weight and overall size that it can be easily placed in position, put away and transported by a single workman.

A still further important and primary object of the invention is to provide a unique combination of the character and type disclosed herein to provide a collapsible combination unit which is readily transportable and can be easily moved to and around the job site.

Another important and primary object of the invention disclosed herein is to provide a smaller, more compact overall package for storage within a smaller space than a normal table saw arrangement which is a necessary for transporting the entire assembly back and forth, to and from the job or work site.

Another significant and important object of the instant invention is to provide a unit of the type and character disclosed herein which may be easily passed through a normal three foot wide doorway.

These, together with the various ancillary objects and features of the invention which will become apparent as the following description proceeds, are attained by this combination collapsible, movable and mobile electric saw and work bench, preferred embodiments thereof being shown in the accompanying drawings, by way of example only.

DESCRIPTION OF THE PREFERRED EMBODIMENT

Figure 1:
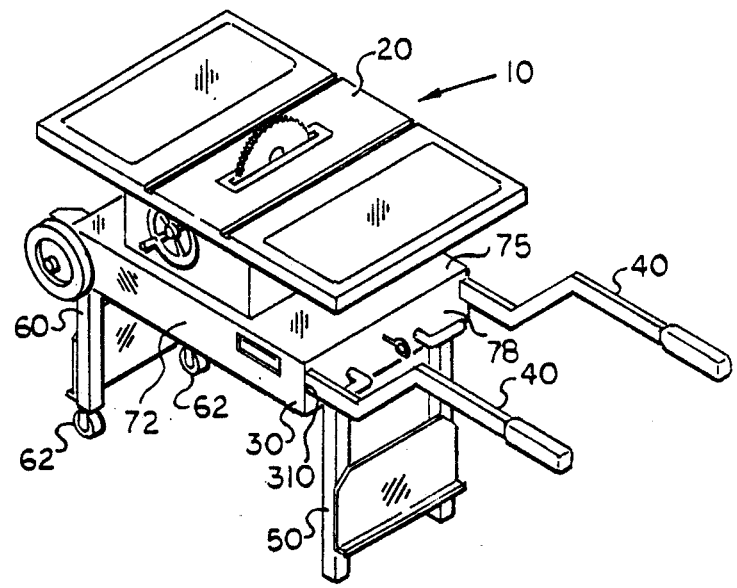
FIG. 1 is a perspective drawing of the instant invention as viewed from above and the front and shown setup and ready for use.

With reference to FIG. 1 there is shown a combination electric table saw and folding, mobile work bench generally identified at 10, including an electric table saw 20 of the type that is commercially available and weighing approximately 250 to 350 pounds, a folding, mobile work bench 30. As part of the work bench 30, there is also shown two removable accessory handles 40, rear leg assembly 50, and forward leg assembly 60 having attached thereto leg wheels 62. Also shown is top surface 75, right side 78, handle opening 310, and front side 72.

Figure 2:
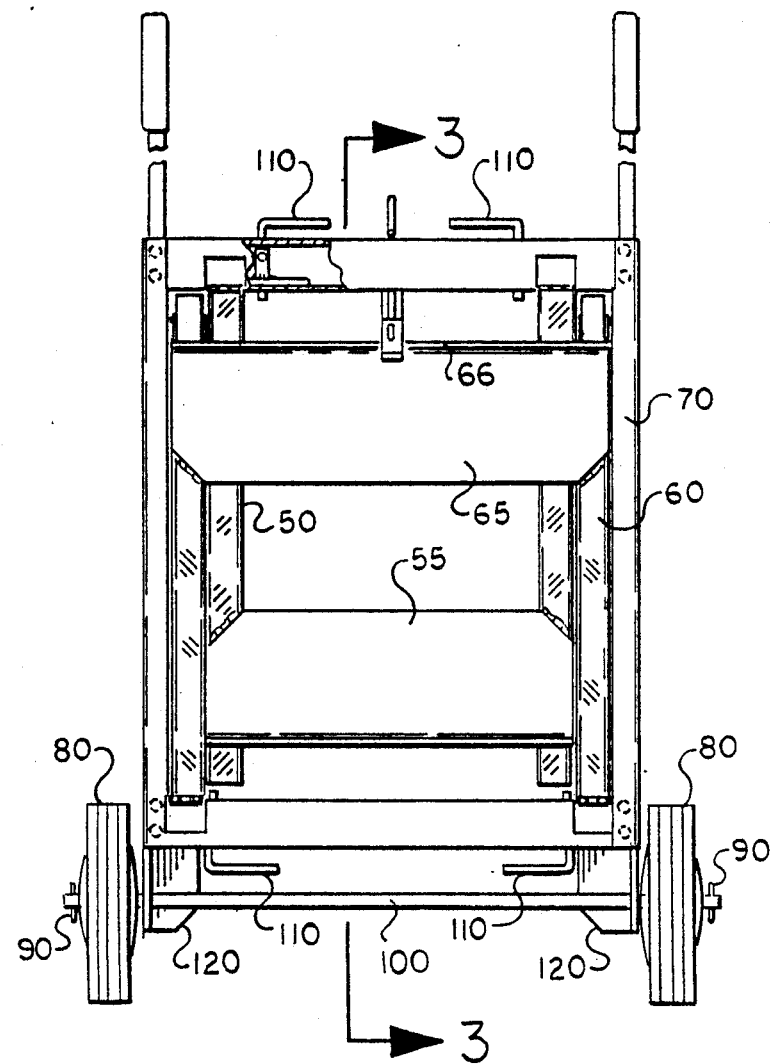
FIG. 2 is an elevation showing the instant invention folded, in a storage orientation and with the table saw removed.

With reference to FIG. 2 there is shown folding, mobile work bench 30 folded for storage and with electric table saw 20 removed. Folding, mobile work bench 30 is shown with right and left leg assemblies 50, 60 folded into a closed position for storage within bench frame 70. There is shown large wheels 80 rotatably mounted upon axle 100 and captured thereupon by cotter pins 90, and axle 100 is in turn flexibly held by axle mounting means 120 which are mounted at one end of bench frame 70. Four handles 110 are mounted, two at each end, to bench frame 70 and are shown in their unlocked position. Right and left gusset plates 55, 65 are fixed to right and left leg assemblies 50, 60 respectively and as shown right leg assembly 50 folds within left leg assembly 60. Also shown is linear ridge 66.

Figure 3:
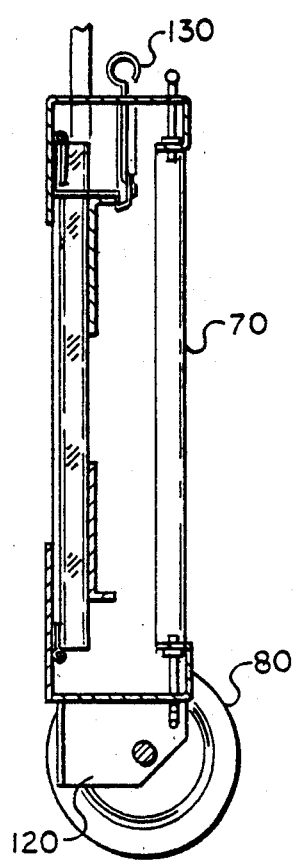
FIG. 3 is a vertical section taken through FIG. 2.
Figure 6:
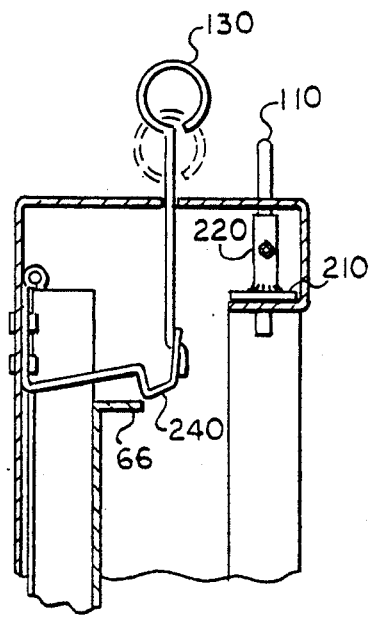
FIG. 6 is an enlarged view of the upper portion of FIG. 3 showing the leg securing method and the locking mechanism for the folded legs.

With reference to FIG. 3 and more particularly FIG. 6 there is shown unlocking rod 130, one end of which is fixed to locking spring 240. In its folded position, left leg assembly 60 disposes linear ridge 66 beneath locking spring 240.

Figure 4:
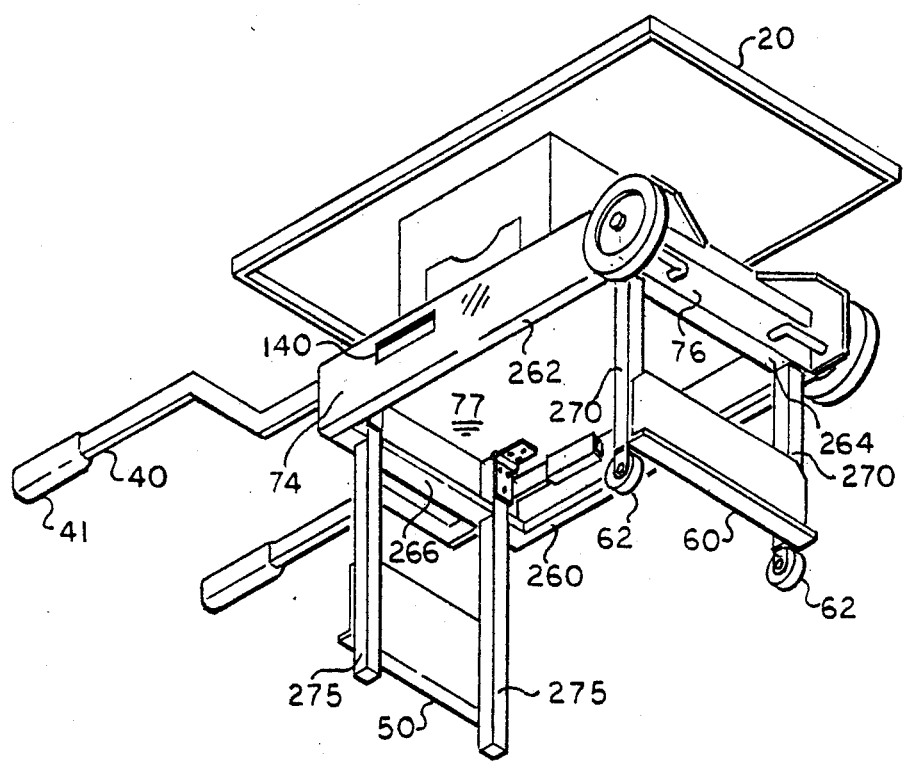
FIG. 4 is a perspective drawing of the instant invention as viewed from below and from the rear, shown setup and ready for use.

With reference to FIG. 4 there is shown dimple slot 140 which is a cutout on the front side 72 and on the back side 74 of bench frame 70 both of which are receptacles for accessory handle 40.

Figure 5:
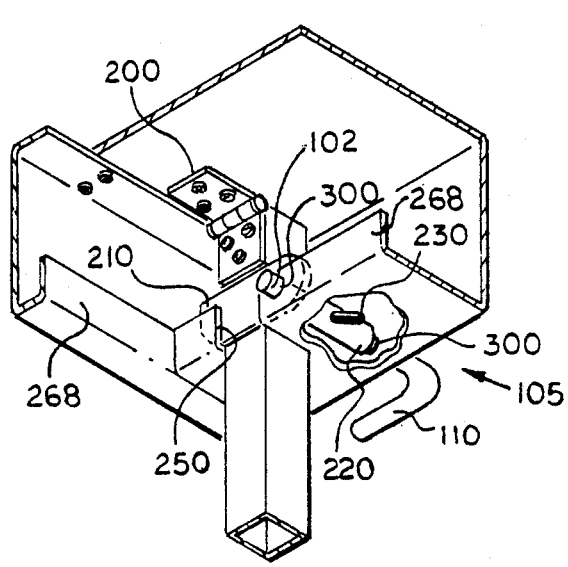
FIG. 5 is a partial view of the typical corner construction and hinge and method of securing the leg when setup and locked into position.

With reference to FIG. 5 there is shown leg 270 unfolded and locked within cutout 250. Locking dog 210 is disposed across said leg and held by vertical lip 268. Hinge assembly 200 is bolted to leg 270 and to underside 77 of top surface 75. Handle 110 is attached to shaft 102 which is disposed through and held by clearance holes 300, shaft 102 is inside of sleeve 220, and both are joined by spring pin 230. Locking dog 210 is fixedly attached to sleeve 220.

OPERATION OF THE INVENTION

The preferred embodiment, as depicted in FIGS. 2 and 3 shows the instant invention with both left and right leg assemblies 50, 60 folded into bench frame 70. In this position leg assemblies 50, 60 are locked into place by locking spring 240 which restrains linear ridge 66 thereby preventing movement of left leg assembly 60, which in turn restrains right leg assembly 50. In this folded position the instant invention presents a small profile taking up little floor space. In storage, accessory handles 40 are removed by sliding them out of dimple slots 140 and handle openings 310 and placing them inside bench frame 70.

To setup the instant invention for use with a machine tool such as an electric table saw 20, the within invention is positioned as shown in FIG. 2 and accessory handles 40 are removed from within bench frame 70. Unlocking rod 130 is pulled upward as shown in FIG. 6. This allows left leg assembly 60 to be swung down with left legs 270 pressed into cutouts 250. Left legs 270 are locked into place by turning handles 110 through a rotational angle of 180 degrees swinging locking dogs 210 across left legs 270 as shown in FIG. 5. The bench frame may now be tilted slightly so that it rests upon large wheels 80 and small wheels 62. Right leg assembly 50 is then hinged upward and locked into place similarly to left leg assembly 60. Folding, mobile work bench 30 is then placed upright onto its four legs 270 and accessory handles 40 are slid into position through handle openings 310 until engagement with dimple slots 140 is make as shown in FIG. 4. Electric table saw 20 or other machine tool is now bolted to the top surface of folding, mobile work bench 30. The instant invention is now ready for use as shown in FIG. 1.

The instant invention is moved over short distance or repositioned where needed by lifting right side 78 with accessory handles 40 and rolling the left side on small wheels 62. For transporting the instant invention over longer distances or over rough ground, left leg assembly 60 is unlocked by reversing the previous locking procedure and then left side 76 is lowered while using accessory handles 40 for leverage until large wheels 80 make contact with the ground. Left leg assembly 60 is swung up against underside 77 where it automatically locks into place under locking spring 240. The within invention is moved upon large wheels 80 while pushing with accessory handles 40 and lifting right leg assembly 50 slightly. After arriving at the work site the instant invention is setup by releasing left leg assembly 60 with unlocking rod 130 and then lifting left side 76 by pressing downward onto accessory handles 40 while forward leg assembly swings automatically into place in the vertical orientation. Before use, left leg assembly 60 must be locked as previously described.

Having thus described my invention what I claim as new, useful and non-obvious and, accordingly secure by Letters Patent of the United States is:

1. A combination electric table saw and folding, mobile work bench, said folding, mobile work bench comprising: a bench frame having a horizontal rectangular top surface and four vertical sides adjacent to the four edges of said top surface forming front, back, left and right sides, said sides each extending from said top surface downward and having attached thereto a horizontal flange extending inward and having at its inward edge a vertical lip, said flanges on said left and right sides each having two rectangular open cutouts, said cutouts on said left side being located further apart than said cutouts on said right side, and an axle held rigidly in horizontal orientation parallel and fixed to said left side, said axle having rotatively attached thereto at each end one large wheel, and a left and a right leg assembly each comprising a pair of legs each of square cross section, each said pair of legs; being held in parallel orientation by a gusset plate, and hingably attached at one end to said bench frame whereby said legs may be hinged closed to fold flat within said bench frame for storage or hinged open to fold in perpendicular orientation against said top surface while fitting into respective said pairs of said cutouts, for lateral support, and four locking mechanisms, each comprising a handle mounted on a shaft, said shaft supporting a locking dog fixedly mounted at one end whereby rotation of said shaft thereby rotates said locking dog capturing each said leg within each said cutout, and two mountable accessory handles each having a double bend at the center of length and a handle grip at one end, whereby each said handle is mountable to said bench frame for applying motive force, and a locking spring assembly whereby said leg assemblies may be locked into said folded position.

2. A work bench as in claim 1 wherein said top surface, said sides, and said flanges are formed from a single piece of sheet material.

3. A work bench as in claim 1 wherein said top surface, said sides, and said flanges are formed from four separate pieces of sheet material.

4. A method of setting up for use a foldable, mobile work bench having a bench frame consisting of a horizontal, rectangular top surface, and four vertical sides, said sides each extending from said top surface downward and having attached thereto a horizontal flange, said flanges at two ends of said bench frame having two rectangular open cutouts, said bench frame additionally having: an axle held rigidly in horizontal orientation, parallel, and fixed to one said side, said axle having rotatively attached thereto at each end one large wheel, at opposite ends of said bench frame, a left and a right hingably attached leg assemblies each comprising a pair of legs being held in parallel orientation by a gusset plate, four locking mechanisms, each comprising a handle mounted on a shaft, said shaft supporting a locking dog fixedly mounted at one end, two mountable accessory handles each having a double bend at the center of length and a handle grip at one end, two handle openings, and a locking spring assembly; comprising the steps of:

(a) removing said accessory handles from storage within said bench frame,
(b) inserting said accessory handles into said handle openings in said side of said bench frame,
(c) lifting said foldable, mobile work bench onto said large wheels with said handles,
(d) pushing said mobile work bench to a job site upon said large wheels,
(e) positioning said work bench at a near vertical orientation while releasing said locking spring, thereby allowing said left leg assembly to rotate into a position perpendicular to said top surface,
(f) locking said left leg assembly into place by rotating said dogs into a locked position,
(g) swinging said right leg assembly into a position perpendicular to said top surface, and locking said leg assembly into place using said dogs,
(i) rotating said bench assembly onto all four legs by pulling down on said accessory handles.

5. A folding, mobile work bench comprising: a bench frame, a right leg assembly, a left leg assembly, a pair of large wheels, and a pair of accessory handles said bench frame being a five sided rectangular box having open bottom parallel to the ground, said right and left leg assemblies being pivotally attached within opposite ends of said bench frame and positionable into and out of supporting relation thereto and in said supporting position each being held within cutouts in said bench frame and locked therein by locking dogs, or alternately being stored within said bench frame in folded locked position, said pair of large wheels being rotatively mounted on one end of said bench frame, said pair of accessory handles removably mounted to the opposite end of said bench frame whereby said mobile work bench can be manually supported by said handles for mobile transport upon said wheels.

* * * * *